(12) United States Patent
Hamilton (10) Patent No.: US 9,235,826 B1
(45) Date of Patent: Jan. 12, 2016

(54) MANAGING DELAYED PARTICIPATION IN A COMMUNICATION SESSION

(75) Inventor: Robert William Hamilton, London (GB)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 13/526,355

(22) Filed: Jun. 18, 2012

Related U.S. Application Data (60) Provisional application No. 61/497,902, filed on Jun. 16, 2011.

(51) Int. Cl.
*G06F 15/16* (2006.01)
*G06Q 10/10* (2012.01)

(52) U.S. Cl.
CPC ........................... *G06Q 10/10* (2013.01)

(58) Field of Classification Search
CPC .. G06Q 10/10; H04L 29/06; H04L 29/08072; H04L 29/06027; H04L 12/581
USPC .................. 709/201–206, 217, 232
See application file for complete search history.

(56) References Cited

U.S. PATENT DOCUMENTS

| | | | | |
|---|---|---|---|---|
| 6,101,480 | A * | 8/2000 | Conmy et al. | 705/7.18 |
| 6,502,127 | B1 | 12/2002 | Edwards et al. | |
| 6,724,764 | B2 | 4/2004 | Bondarenko et al. | |
| 6,856,962 | B2 * | 2/2005 | Yonemitsu | 705/7.13 |
| 7,251,320 | B1 | 7/2007 | Todd | |
| 7,308,090 | B2 | 12/2007 | White et al. | |
| 7,343,312 | B2 * | 3/2008 | Capek et al. | 705/7.19 |
| 7,389,473 | B1 | 6/2008 | Sawicki et al. | |
| 7,398,294 | B2 * | 7/2008 | Florkey et al. | 709/204 |
| 7,669,115 | B2 | 2/2010 | Cho et al. | |
| 7,756,816 | B2 | 7/2010 | Scott | |
| 7,987,233 | B1 * | 7/2011 | Osborne et al. | 709/206 |
| 8,060,565 | B1 | 11/2011 | Swartz | |
| 8,065,282 | B2 | 11/2011 | Simison et al. | |
| 8,081,958 | B2 | 12/2011 | Soderstrom et al. | |
| 8,250,141 | B2 | 8/2012 | Xiao et al. | |
| 8,270,320 | B2 | 9/2012 | Boyer et al. | |

(Continued)

OTHER PUBLICATIONS

Conference call facility www.google.com/patents/US2004073288A2?cl=en App.—Filed Feb. 11, 2004—Published Aug. 26, 2004—Christopher White—Mobix Global Holdings Ltd.*

(Continued)

*Primary Examiner* — Liangche A Wang
*Assistant Examiner* — Melaku Habtemariam (57) ABSTRACT

This disclosure relates to a method and system for managing participation in a communication channel when one or more participants may be delayed. In one example, a method includes retrieving, by a first computing device, a meeting appointment including an invitee, a meeting start time, and identifying information for a communication channel for the meeting, wherein the invitee to the meeting is invited to the communication channel and the invitee is associated with a second computing device. The method further includes sending, by the first computing device, a request to the second computing device, wherein the request enables the second computing device to join the communication channel, and wherein the request is sent approximately at the meeting start time. The method also includes receiving, by the first computing device, a control message that indicates a first time at which the second computing device will join the communication channel.

19 Claims, 6 Drawing Sheets

(56) References Cited

U.S. PATENT DOCUMENTS

| | | | |
|---|---|---|---|
| 8,553,065 | B2 | 10/2013 | Gannu et al. |
| 8,582,743 | B2 | 11/2013 | Teng et al. |
| 8,583,784 | B2 | 11/2013 | Beebe et al. |
| 8,688,489 | B2 * | 4/2014 | Bhogal et al. ............... 705/7.11 |
| 2002/0147625 | A1 * | 10/2002 | Kolke, Jr. ......................... 705/9 |
| 2005/0018826 | A1 | 1/2005 | Benco et al. |
| 2005/0018827 | A1 | 1/2005 | Himmel et al. |
| 2005/0289202 | A1 | 12/2005 | S et al. |
| 2006/0026502 | A1 | 2/2006 | Dutta |
| 2006/0067250 | A1 | 3/2006 | Boyer |
| 2006/0239212 | A1 * | 10/2006 | Pirzada et al. ............... 370/260 |
| 2006/0250987 | A1 | 11/2006 | White |
| 2008/0195585 | A1 | 8/2008 | Altberg et al. |
| 2008/0205616 | A1 | 8/2008 | Teng et al. |
| 2008/0226051 | A1 | 9/2008 | Srinivasan |
| 2008/0240392 | A1 | 10/2008 | Berstis et al. |
| 2009/0083639 | A1 | 3/2009 | McKee Cooper et al. |
| 2009/0112671 | A1 | 4/2009 | Grodum |
| 2009/0112984 | A1 * | 4/2009 | Anglin et al. ............... 709/204 |
| 2009/0192845 | A1 | 7/2009 | Gudipaty et al. |
| 2009/0327019 | A1 * | 12/2009 | Addae et al. ...................... 705/9 |
| 2010/0005142 | A1 * | 1/2010 | Xiao et al. .................... 709/204 |
| 2010/0076804 | A1 * | 3/2010 | Jones ............................... 705/8 |
| 2010/0098230 | A1 | 4/2010 | Bhow |
| 2010/0121666 | A1 * | 5/2010 | Niazi ............................... 705/8 |
| 2010/0158220 | A1 | 6/2010 | Silverman |
| 2010/0189238 | A1 * | 7/2010 | Gupta ...................... 379/202.01 |
| 2010/0189244 | A1 | 7/2010 | Sastry |
| 2010/0189260 | A1 | 7/2010 | Ramanathan et al. |
| 2010/0217591 | A1 | 8/2010 | Shpigel |
| 2010/0235216 | A1 | 9/2010 | Hehmeyer et al. |
| 2010/0310062 | A1 | 12/2010 | Srinivasan et al. |
| 2011/0054976 | A1 * | 3/2011 | Adler et al. ....................... 705/9 |
| 2011/0135079 | A1 | 6/2011 | Shah et al. |
| 2011/0270922 | A1 | 11/2011 | Jones et al. |
| 2012/0230484 | A1 * | 9/2012 | Kannappan et al. ..... 379/202.01 |
| 2012/0258726 | A1 | 10/2012 | Bansal et al. |
| 2012/0278381 | A1 | 11/2012 | Ferlitsch et al. |
| 2012/0293605 | A1 | 11/2012 | Seferian et al. |
| 2012/0304078 | A1 | 11/2012 | Ramaswamy et al. |
| 2013/0237240 | A1 * | 9/2013 | Krantz et al. .............. 455/456.1 |

OTHER PUBLICATIONS

Managing participants in a conference via a conference user interface www.google.com/patents/US20110270922 App.—Filed Apr. 30, 2010—Boland T. Jones—American Teleconferencing Services Ltd.*

An intelligent fuzzy meeting agent for decision support system Chang-Shing Lee ; Chen-Yu Pan Fuzzy Systems, 2003. FUZZ '03. The 12th IEEE International Conference.*

Conference call facility www.google.com/patents/WO2004073288A2?cl=en App.—Filed Feb. 11, 2004—Published Aug. 26, 2004—Christopher White—Mobix Global Holdings Ltd.*

"Cisco WebEx for the Android", Cisco [online]. First accessed on May 13, 2011. Retrieved from the Internet: <http://www.webex.com/android/android_faq.html> (4 pgs.).

Henry, "Bridg.me Calls You When the Conference Starts," Apr. 24, 2011, Lifehacker [online]. Retrieved from the Internet: <http://lifehacker.com/5795119/bridgme-calls-you-when-the-conference-starts> (2 pgs.).

"Impossibly Simple Conference Calling,", Bridg.Me [online]. First accessed on May 13, 2011. Retrieved from the Internet: <http://beta.bridg.me/> (1 pg.).

Framer, "Conference Calling Provider," Jun. 17, 2010, Article Trader [online]. Retrieved from the Internet: <http://www.articletrader.com/business/communication/conference-calling-provider.html> (2 pgs.).

"Dial-Out to conference call participants automatically with UBlast," American International Telephonics, LLC [online]. First accessed on May 13, 2011. Retrieved from the Internet: <http://www.aitelephone.com/conference-call-group-dial-out.html> (4 pgs.).

"WebEx Meeting Center," Cisco [online]. First accessed on May 13, 2011. Retrieved from the Internet: <http://try.webex.com/meet/shop/webex_express_06.html> (4 pgs.).

Tsotsis, "With Bridg.me The Conference Calls You," Apr. 21, 2011, TechCrunch [online]. Retrieved from the Internet: <http://techcrunch.com/2011/04/21/with-bridg-me-the-conference-calls-you/> (1 pg.).

Horowitz, "Idea of the Day: A Conference Line That Calls All of the Participants So They Don't Have To Dial In," Apr. 22, 2011, Business Insider [online]. Retrieved from the Internet: <http://www.businessinsider.com/idea-of-the-day-schedule-a-conference-call-on-google-calanders-and-bridgme-will-call-all-participants-at-the-correct-time-2011-4> (2 pgs.).

Non-Final-Office Action mailed Dec. 24, 2014 in U.S. Appl. No. 13/526,247.

Final-Office Action mailed Apr. 15, 2014 in U.S. Appl. No. 13/526,247.

Non-Final-Office Action mailed Oct. 15, 2013 in U.S. Appl. No. 13/526,247.

Non-Final-Office Action mailed Feb. 24, 2014 in U.S. Appl. No. 13/526,234.

Non-Final-Office Action mailed Dec. 22, 2014 in U.S. Appl. No. 13/526,234.

Notice of Allowance mailed Aug. 18, 2014 in U.S. Appl. No. 13/526,234.

Final-Office Action mailed May 14, 2015 in U.S. Appl. No. 13/526,247.

* cited by examiner

MANAGING DELAYED PARTICIPATION IN A COMMUNICATION SESSION

RELATED APPLICATION

This application claims the benefit of U.S. Provisional Patent Application No. 61/497,902, filed Jun. 16, 2011, which is hereby incorporated by reference in its entirety.

TECHNICAL FIELD

The disclosure relates to computing devices and, more particularly, to computing devices engaging in a communication session.

BACKGROUND

Computing devices may establish communications between one or more devices associated a group of people or locations (for example, during an audio or video conference). Conventionally, participants using participant devices may join the communication session by, for example, entering a special code after dialing an appropriate phone number or accessing a particular network. The communication session may not begin when scheduled, as interruptions, errors in the access instructions, and forgetfulness may delay a participant using a participant device from joining on time.

SUMMARY

In one example, the disclosure is directed to a method for retrieving, by a first computing device, a meeting appointment including an invitee, a meeting start time, and identifying information for a communication channel for the meeting, wherein the invitee to the meeting is invited to the communication channel and the invitee is associated with a second computing device. The method further includes sending, by the first computing device, a request to the second computing device, wherein the request enables the second computing device to join the communication channel, and wherein the request is sent approximately at the meeting start time. The method also includes receiving, by the first computing device, a control message that indicates a first time at which the second computing device will join the communication channel.

In another example, a computer-readable storage medium comprising instructions that, when executed, causes one or more processors of a first computing device to perform operations is disclosed. The operations include retrieving, by the first computing device, a meeting appointment including an invitee, a meeting start time, and identifying information for a communication channel for the meeting, wherein the invitee to the meeting is invited to the communication channel and the invitee is associated with a second computing device. The operations further include sending a request to the second computing device, wherein the request enables the second computing device to join the communication channel, and wherein the request is sent approximately at the time specified in a meeting notification of the calendar application associated with the invitee. The operations also include receiving a control message that indicates a time at which the second computing device will join the communication channel.

In yet another example, a first computing device is provided. The first computing device comprises at least one processor and at least one network device. The first computing device further comprises a communications module configured to retrieving a meeting appointment including an invitee, a meeting start time, and identifying information for a communication channel for the meeting, wherein the invitee to the meeting is invited to the communication channel and the invitee is associated with a second computing device, wherein the communications module is further configured to send a request to the second computing device, wherein the request enables the second computing device to join the communication channel, and wherein the request is sent approximately at the time specified in a meeting notification of the calendar application associated with the invitee, wherein the communications module is further configured to receive a control message that indicates a time at which the second computing device will join the communication channel.

The details of one or more embodiments are set forth in the accompanying drawings and the description below. Other features, objects, and advantages will be apparent from the description and drawings, and from the claims.

DETAILED DESCRIPTION

A communication session, such as a video or audio teleconference, establishes communication between one or more computing devices, such as telephones, laptop and desktop computers, cellular and smart phones, and video conferencing equipment, to name only a few examples. The ubiquity of calendar applications executed by such devices has made scheduling a teleconference or other communication session among a plurality of computing devices relatively straight forward. Email or other messaging means allow invitations to a communication session to be rapidly distributed and accepted and even automatically entered into the calendar of an invitee. Shared online calendars identify scheduling conflicts and allow prompt rescheduling of a meeting or other communication session as conflicts arise. As used herein, the terms "communication channel" and "communication session" may be used interchangeably.

These calendar applications, scheduling programs, and computers do not account for the uncertainties of life. From difficulty starting the car to a colleague in the office dropping by, unscheduled and unanticipated delays may rapidly derail the careful synchronization created by the calendar applications of a communication session participant. Further, the delays in one participant joining a communication session may affect all participants in the communication session. For example, some teleconferencing protocols require that all members be present to begin the meeting. In other situations, the delayed participant may be the main presenter or the person who is supposed to lead or manage the communication session. Unanticipated delays may slow the progress of the meeting and the result in the loss of important information, causing participants in the communication session to cancel or creating unproductivity as the other participants are forced to wait.

A communication session as used herein is a broad term encompassing as its plain and ordinary meaning, including but not limited to, one or more objects, which may be stored in and/or are executable by hardware, that may enable communication clients coupled to the one or more objects to exchange information. The one or more objects may include data and/or provide functionality of a communication session as described herein.

A communication session may include point-to-point and multi-point communications between a plurality of computing devices remotely located from one another. The communication session may be managed by a central server independent of the participant devices in the communication session or hosted by one of the computing devices participating in the communication session. Communication may include telephony, video conferencing, and text-based (such as instant messaging and chat rooms) means of communication between a plurality of computing devices.

In accordance with the techniques of this disclosure, a computing device, such as a server or a participating computing device, may be configured to send one or more requests to join a communication session to a plurality of computing devices listed in a meeting notification. The request may allow a computing device to join the communication session, reducing the chances that a participant scheduled to join the meeting may forget about the communication session. The request may also contain some form of identification protocol, allowing the security of the communication session to be maintained. Further, the request may allow a device associated with an invitee to the meeting to postpone joining the communication session. Postponement may include sending a control message to the requesting computing device stating the duration of the postponement such that a second request may be sent later. By postponing joining the communication session, instead of ignoring the request to join the communication session, the delay in the invitee joining the communication session may be managed. For example, the delay may be communicated to the other participant devices in the communication session allowing them to take mitigating action, such as reordering the planned topics of the meeting or joining the communication session later when the computing device associated with the delayed invitee joins.

Figure 1:
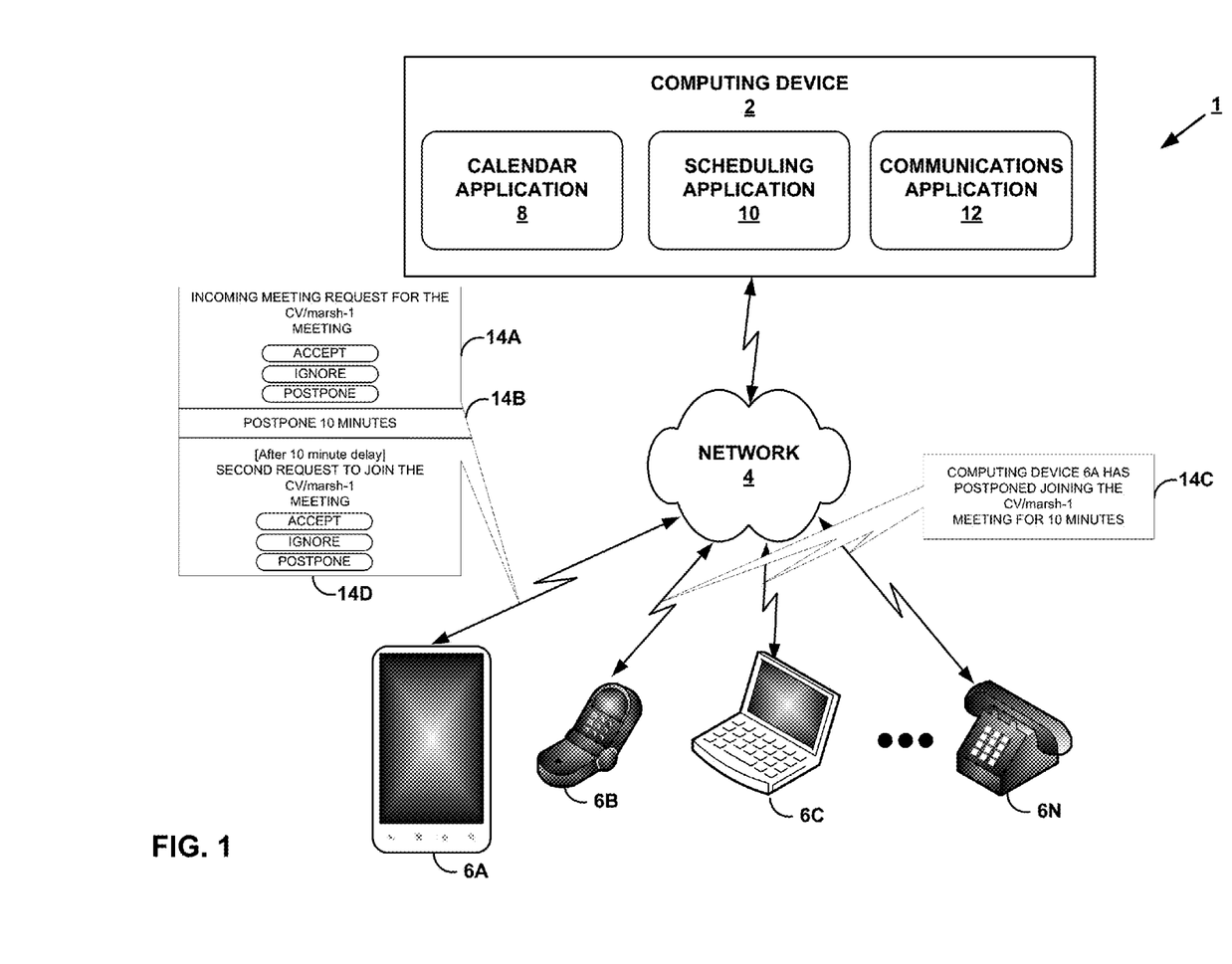
FIG. 1 is a diagram illustrating an example system that is configured to connect a plurality of computing devices in a communication session, in accordance with one or more aspects of the present disclosure.

FIG. 1 is a diagram illustrating example system 1 for connecting a plurality of computing devices, computing devices 6-1 to 6-N (collectively referred to herein as computing devices 6), in a communication session. A communication session may include point-to-point and/or multi-point communication between a plurality of computing devices allowing a plurality of participants to communicate in real-time. Some invitees to the communication session may choose not to join or delay joining in a communication session. Invitee denotes a person or persons invited to join a communication session while a participant is a person or persons who have joined the communication session. Example system 1 may include server device 2, network 4, and computing devices 6.

Computing devices 6 represent a plurality of computing devices controlled by a plurality of invitees to participate in a communication session. Computing devices 6 may include any computing device configured to transmit and receive, in real time, an expression of the ideas of a participant in a communication session over network 4. Examples of computing devices 6 include, but are not limited to, telephones, cellular phones, smart phones, video conferencing units, laptop and desktop computers, and similar devices. Computing devices 6 may transmit video images, audio, text based messages, and other forms of data. Communications between computing devices 6 may be managed by server device 2.

Server device 2 may, in some examples, be associated with a participant in the communication session, for example, server device 2 may be a smartphone, laptop, or other computing device a participant uses to communicate with other invitees to the communication session. Server device 2 may comprise a processor that may execute instructions to run applications, such as a calendar application 8, a scheduling application 10, and a communications application 12. An example of server device 2 is discussed below with respect to FIG. 2.

Server device 2 may access a meeting notification in calendar application 8 stored on server device 2. In other examples, the meeting notification may be located remotely from server device 2 and server device 2 may access the meeting notification over a network, for example, network 4. The notification may contain details of an upcoming communication session. For example, a meeting notification may include a calendar entry, stored on server device 2. The calendar entry may list the time of and date of the communication session and the participants to be invited to the communication session.

As a communication session participant, server device 2 may host the communication session, functioning as a central node relaying the transmission of each participating computing device 6-1 to 6-N to the other participating computing devices 6. In other examples, the communication session may be conducted by an independent server and server device 2 may be configured as a gateway device, composing and transmitting messages controlling access to the communication session held on the independent server. In some examples, server device 2 may not be a computing device that is associated with a participant in the communication session. Server device 2 may be configured as a server that facilitates the communication session.

Server device 2 may communicate with each of computing devices 6 participating in the communication session over network 4, relaying transmissions each of the computing devices 6 to the other computing devices 6. Server device 2 may access the meeting notification that describe the communication session to identify computing devices 6 in order to request that computing devices 6 join the communication session. In some examples, the meeting notification may be stored locally on server device 2, for example, using calendar application 8. Alternatively, the meeting notification may be stored remotely from server device 2, for example, on one or more of computing devices 6 or an third-party calendar server (for example, a server for an online scheduling program), and server device 2 may access the meeting notification over network 4 or a secondary network.

Calendar application 8 may be a software or hardware component operable by server device 2 to manage scheduling for one or more of computing devices 6. Calendar application 8 may be configured to interface with one or more calendars or other scheduling mechanisms. Calendar application 8 may identify a scheduled communication session in a meeting notification and retrieve data representing the participants invited to the communication session and the date and time of the communication session. Calendar application 8 may communicate, over network 4, with calendar programs stored remotely on computing devices 6 or other servers. In some examples, calendar application 8 may be configured to function as a calendar program, allowing computing devices 6 to store information about a communication session on server device 2. Calendar application 8 may access schedules associated with multiple invitees to the communication session to check for scheduling conflicts.

Conferencing application 10 may be a software or hardware component operable by server device 2 to control a communication session. Conferencing application 10 may be configured to generate one or more messages that may be sent to one or more computing devices 6. Messages to computing devices 6 may include, for example, requests to join a communication session, notifications of impending communication sessions, and alerts informing participants of delays of one or more invitees in joining the communication session. Conferencing application 10 may also process control messages server device 2 receives from one or more computing devices 6. Control messages may contain information enabling server device 2 to manage the communication session, for example, informing server device 2 of delays associated with an invitee or of a new person who should be invited to join the communication session.

Communications application 12 may be a software or hardware component operable by server device 2 to direct the communications of server device 2. Communications application 12 may identify computing devices 6 associated with the participants invited to participate in the communication session and provide verification when invitees join the communication session in response to a request to join the communication session. In some examples, one or more computing devices may be associated with an invitee to a communication session. Communications application 12 may access one or more databases to identify one or more computing devices associated with the invitee and obtain information allowing server device 2 to send requests to join the communication session and other messages to the computing device(s) associated with the invitee.

Computing devices 6 are coupled to server device 2 through network 4 via a wired connection, wireless links, or both. Network 4 may include a telephone network such as a cellular telephone network, a wide-area network such as the Internet, a local-area network (LAN), an enterprise network, or one or more other types of networks. Computing devices 2 and 6 may transmit and receive data using network 4. In some examples, network 4 may include one or more different networks. For instance, server device 2 may communicate with computing devices 6-1 and 6-2 (a smartphone and cellular telephone respectively) via a cellular telephone network or primary wireless radio connection. Likewise, server device 2 and computing device 6-3 may communicate using a LAN or a public network, such as the Internet, via secondary wireless radio channel. Computing device 6-N, a touch-tone phone, may communicate with server device 2 via a telephone network. Server device 2 may be configured to convert transmissions to and from each of computing devices 6 into one or more formats appropriate to the recipient of the transmissions. For example, server device 2 may convert an analog electrical signal representing the voice of participant from computing device 6-N to a digital Voice over Internet Protocol (VoIP) signal usable by computing device 6-3.

Messages 14A-14D (collectively messages 14) represent an example exchange between computing devices 6 and server device 2 over network 4. Messages 14 may be used when joining a scheduled communication session. In this example, computing devices 6 are associated with invitees to the communication session and the invitee associated with computing device 6-1 is delayed. As shown in FIG. 1, message 14A, from server device 2 to computing device 6-1, is a request for computing device 6-1 to join the communication session. As computing device 6-1 is a smart phone in FIG. 1, message 14A may be formatted as one or more data packets interpreted by an application executed by computing device 6-1. Message 14A may allow computing device 6-1 to accept the request and join the communication session, ignore the request, or postpone accepting the request. Message 14B represents a control message that computing device 6-1 may send in reply to the request of message 14A, postponing entry into the communication session for ten minutes. After the lapse of the ten minute delay specified by message 14B, server device 2 may send a second request, similar to message 14A, to computing device 6-1 to enable the invitee to join the communication session.

Server device 2 may send a notification message, message 14C, to the other computing devices 6 informing their users of the delay of computing device 6-1 in joining the communication session. This message may take varying forms. For example, computing device 6-N is shown as a touch-tone phone and is incapable of displaying text or binary coded messages to an invitee. Server device 2 may reformat the notification, rendering the notification into speech and transmit the verbal message to computing device 6N. The verbal message may also be sent to computing device 6-2 and 6-3. Alternatively, server device 2 may generate a Short Message Service (SMS) text message, Instant Message (IM), series of data packets, or email message for message 14C.

Figure 2:
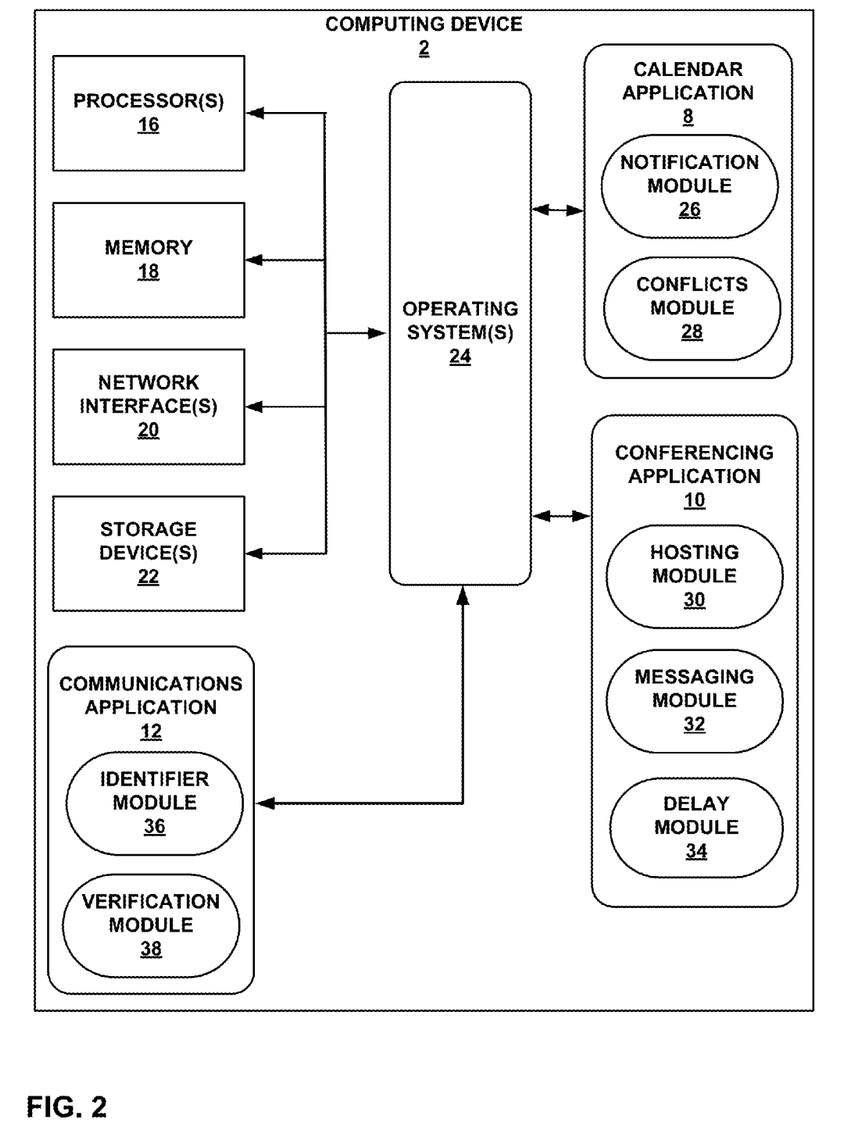
FIG. 2 is a block diagram illustrating an example server device that connects the plurality of computing devices shown in FIG. 1 in a communication session, in accordance with one or more aspects of the present disclosure.

FIG. 2 is a block diagram illustrating an example server device 2 that connects the plurality of computing devices 6 shown in FIG. 1 in a communication session, in accordance with one or more aspects of the present disclosure. FIG. 2 illustrates only one particular example of server device 2, and many other example embodiments of server device 2 may be used in other instances.

As shown in FIG. 2, server device 2 includes calendar application 8, conferencing application 10, communications application 12, operating system 24, one or more processors 16, memory 18, one or more network interfaces 20, one or more storage devices 22, input device(s), and output device(s). Operating system 24, calendar application 8, conferencing application 10, and communications application 12 are executable by one or more components of server device 2. Each of components 16, 18, 20, and 22 may be interconnected (for example, one or more of physically, communicatively, or operatively connected) for inter-component communications. Calendar application 8 may include notification module 26 and conflicts module 28. Conferencing application 10 may include hosting module 30, messaging module 32, and delay module 34. Communications application 12 may include identifier module 36 and verification module 38. In some examples, one or more of modules 26, 28, 30, 32, 34, 36, and 38 may be part of the same application or module. In some examples, one or more of modules 26, 28, 30, 32, 34, 36, and 38, and one or more processors 16 may be formed in a common hardware unit. In certain examples, one or more of modules 26, 28, 30, 32, 34, 36, and 38 may be software and/or firmware units that are executed on or operable by one or more processors 16.

One or more processors 16, in one example, are configured to implement functionality and/or process instructions for execution within server device 2. For example, processor(s) 16 may be capable of processing instructions stored in memory 18 or instructions stored on storage device(s) 22. Such instructions may include components of operating system 24, calendar application 8, conferencing application 10, and communications application 12, or one or more modules of applications 8, 10, and 12.

Memory 18, in one example, may be configured to store information within server device 2 during operation of server device 2. Memory 18, in some examples, is a computer-readable storage medium. In some examples, memory 18 is a temporary memory. Memory 18, in some examples, is a volatile memory, meaning that memory 18 does not maintain stored contents when the computer is turned off. Examples of volatile memories include random access memories (RAM), dynamic random access memories (DRAM), static random access memories (SRAM), and other forms of volatile memories known in the art. In some examples, memory 18 is used to store program instructions for execution by processors 16. Memory 18, in one example, is used by software or applications running on server device 2 (for example, operating system 24, calendar application 8, conferencing application 10, and communications application 12) to temporarily store information during program execution.

One or more storage device(s) 22, in some examples, also include one or more computer-readable storage media. Storage device(s) 22 may be configured to store information in a dataset. Storage devices 22 may further be configured for long-term storage of information. In some examples, storage devices 22 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 2, in some examples, also includes one or more network interface(s) 20. Server device 2, in one example, utilizes network interface(s) 20 to communicate with external devices (for example, computing devices 6) via one or more networks 4, such as one or more wireless networks. Network interface(s) 20 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB.

Server device 2 also includes one or more input devices. Input device(s), in some examples, are configured to receive input from a user through voice, keyboard, or other user input. Examples of input device (e.g., input device(s) 48 shown in FIG. 3) include a keyboard/keypad, microphone, and video camera. One or more output devices (e.g., output device(s) 50 shown in FIG. 3) may also be included in server device 2. Output device(s) 50, in some examples, may be configured to provide output to a user using tactile, audio, or visual output. Output device(s) 50, in one example, includes a screen or a speaker, and may utilize a sound card, a video graphics adapter card, or any other type of device for converting a signal into an appropriate form understandable to humans or machines. Additional examples of output device(s) 50 include a speaker, a cathode ray tube (CRT) monitor, a liquid crystal display (LCD), or any other type of device that can generate intelligible output to a user.

Server device 22 may include one or more operating systems 24. Operating system(s) 24, in some examples, may control the operation of components of server device 2. For example, operating system(s) 24, in one example, facilitates the interaction of calendar application 8, conferencing application 10, and communications application 12 with one or more of processors 16, memory 18, network interface 20, and storage device 28.

Any applications or software modules (for example, calendar application 8, conferencing application 10, and communications application 12) implemented within or executed by server device 2 may be one or more of implemented or contained within, operable by, executed by, or be operatively or communicatively coupled to components of server device 2, such as processors 16, memory 18, network interface(s) 20, or storage device(s) 22.

Calendar application 8 may be configured to access one or more calendars or schedules of an invitee to a communication session and obtain data about the communication session stored in a meeting notification. Calendar application 8 may retrieve the identity of communication session invitees, scheduling information (such as date and time) of the communication session, plan of the communication session, and information about one or more computing devices associated with the invitees to the communication session. Calendar application 8 may also, in some examples, be configured to access multiple calendars and schedules of the invitees to verify that no conflicts with the communication sessions exist. Calendar application 8 may include notification module 26 and conflicts module 28.

Notification module 26 may be configured to access an electronic calendar or schedule containing data describing a communication session. The electronic calendar or schedule may be stored locally on server device 2, for example in storage device 22 in a database, or remotely over network 4, such as on one of computing devices 6. In some examples, notification module 26 may duplicate a remotely located schedule and store the duplicated copy in storage device 22. Notification module 26 may parse an entry in the schedule to identify invitees to the communication session. Notification module 26 may provide the identities of the invitees to identifier module 36 to locate a computing device associated with the invitee. Notification module 26 may also parse the meeting notification to identify a date and time of the communications session for a message for the invitees to the communication session reminding them of the upcoming communication session. Messaging module 32 may create the message in a format appropriate to the receiving computing devices 6.

Conflicts module 28 may be a hardware/software/firmware module that detects scheduling conflicts between the users of computing devices 6. Conflicts module 28 may be configured to access one or more calendars and/or schedules of the invitees to the communication session and verify that no scheduled events conflict with an upcoming communication session. Conflicts module 28 may be configured to notify, via messaging module 32, one or more invitees when a conflict is discovered and allow the invitees to reschedule the communications session or pre-emptively postpone joining the communication session. If an invitee with a scheduling conflict decides to postpone joining the communication session in advance, conflicts module 28 may cause messaging module 32 of conferencing application 10 to generate a message to computing devices 6 associated with the invitees to the communication session. The message may inform the invitees of the postponement and allow the invitees to delay joining the communication session in response to the delay of invitee in joining the communication session.

Conferencing application 10 may be configured to format one or more messages to computing devices 6 that are associated with invitees to the communication session. Conferencing application 10 may also process messages sent to server device 2 by one or more computing devices 6. Conferencing application 10 may be configured to manage the hosting of the communication session 10, for example, through hosting module 30. Conferencing application 10 may include hosting module 30, messaging module 32, and delay module 34.

Hosting module 30 may host the communication session. Hosting module 30 may interface with communications application 12 and network interface 20 to manage the communication session. Hosting module 30 may cause server device 2 to act as a host for the communication session by receiving transmissions from one of computing devices 6 over network 4 and relaying the transmissions to the remainder of computing devices 6. Hosting module 30 may include programs or filters to reduce feedback from the relayed transmissions. Hosting module 30 may also include one or more hardware/software/firmware components that enable hosting module 30 to convert a transmission of one computing device 6 into a format suitable for reception by another of computing devices 6 (for example, converting a VoIP data transmission into an analog voice transmission suitable for reception by a telephone).

Messaging module 32 may formulate one or more messages for transmission to computing devices 6 associated with the invitees to the communication session. Messaging module 32 may format the messages appropriately for reception by computing devices 6. For a particular message, messaging module 32 may obtain information regarding the type of computing device the message is being sent to so that the message may be formatted into an appropriate type (for example, a voice transmission for a telephone, an IM message for a cellular phone, or a series of data packets for a cellular phone or computer). Data about the type of computing device 6 may be recorded in the communication session meeting notification that is accessed by notification module 26. The content of the message generated by messaging module 32 may be pre-defined. One or more of storage device(s) 22 or memory 18 may store text associated with the message. Messaging module 32 may retrieve the message text from storage device 22 and supplement the pre-defined message with information from control messages, data describing the communication session, and so on. Messaging module 32 may transmit the generated messages to computing devices 6 over network 4 via one or more network interface(s) 20.

Messaging module 32 may be configured to interact with other modules, such as, for example, at least one of identifier module 36, hosting module 30, and delay module 34. Messaging module 32 may be configured to process messages received from computing devices 6 via network interface 20. For example, server device 2 may receive a control message specifying another participant or computing device to be invited to the communication session by server device 2. Messaging module 32 may gather identification information from the control message and pass the identification information to communications application 12 to identify a telephone number, Internet Protocol (IP) address, or other means of contacting the new invitee. Messaging module 32 may interface with conflicts module 28 to determine if the new invitee is available to join the communications session and may generate a message requesting that the new invitee join the communication session. When the invitee accepts the request, Messaging module 32 may connect the invitee to the communication session with hosting module 30, allowing the invitee to participate in the communication session. If an invitee delays joining the communication session, messaging module 32 may share relevant information with respect to the delay with delay module 34.

Delay module 34 may be configured to track the passage of time before another request to join a communication session is sent to postponing computing devices 6. In response to the request to join a communication session, a computing device 6 may transmit a control message electing to postpone joining the communication session, and, in some examples, the duration of the postponement. Delay module 34 may cause messaging module 32 to transmit a second request to join the communication session to the postponing computing device 6 after the duration of the postponement has elapsed. In some examples, delay module 34 may also cause messaging module 32 to transmit a message to computing devices 6 informing one or more of computing devices 6 about the postponement. Delay module 34 may also be configured to interface with conflicts module 28, allowing server device 2 to determine if the postponement of a computing device in joining the communications session creates a scheduling conflict. A scheduling conflict may arise, for example, from other commitments of the invitee associated with the postponing computing device or with other invitees associated with computing devices 6.

Communications application 12 may manage network interface(s) 20, control communications security for a communication session hosted by hosting module 30, and identify one or more computing devices associated with an invitee to the communication session. Communications application 12 may find a computing device associated with an invitee to the communication session by consulting one or more databases or other directories. In some examples, communications application 12 may determine an identifier, such as a telephone number or IP address, allowing server device 2 to transmit a message to computing device 6.

Identifier module 36 may be configured to identify one or more computing devices associated with an invitee to a communications session. Identifier module 36 may receive identification information specifying an invitee to a communication session. For example, messaging module 32 and notification module 26 may retrieve the name and organization of an invitee to a communication session from the meeting notification specifying the communication session and pass the data to identifier module 36. Identifier module 36 may access one or more databases, for example, a company directory, or a social network, to link an invitee with computing device 6. Identifier module 36 may retrieve contact information for computing device 6 and return the information to messaging module 32. Using the contact information, messaging module 32 may transmit requests to join the communication session and other messages to computing device 6.

Verification module 38 may be configured to maintain security of the communication session. Verification module 38 may require a password to join a communication session or employ an encryption system to prevent data transmissions of the communication session from being intercepted. Verification module 38 may also be configured to verify that an invitee to a communication session is permitted to join the communication session.

Figure 3:
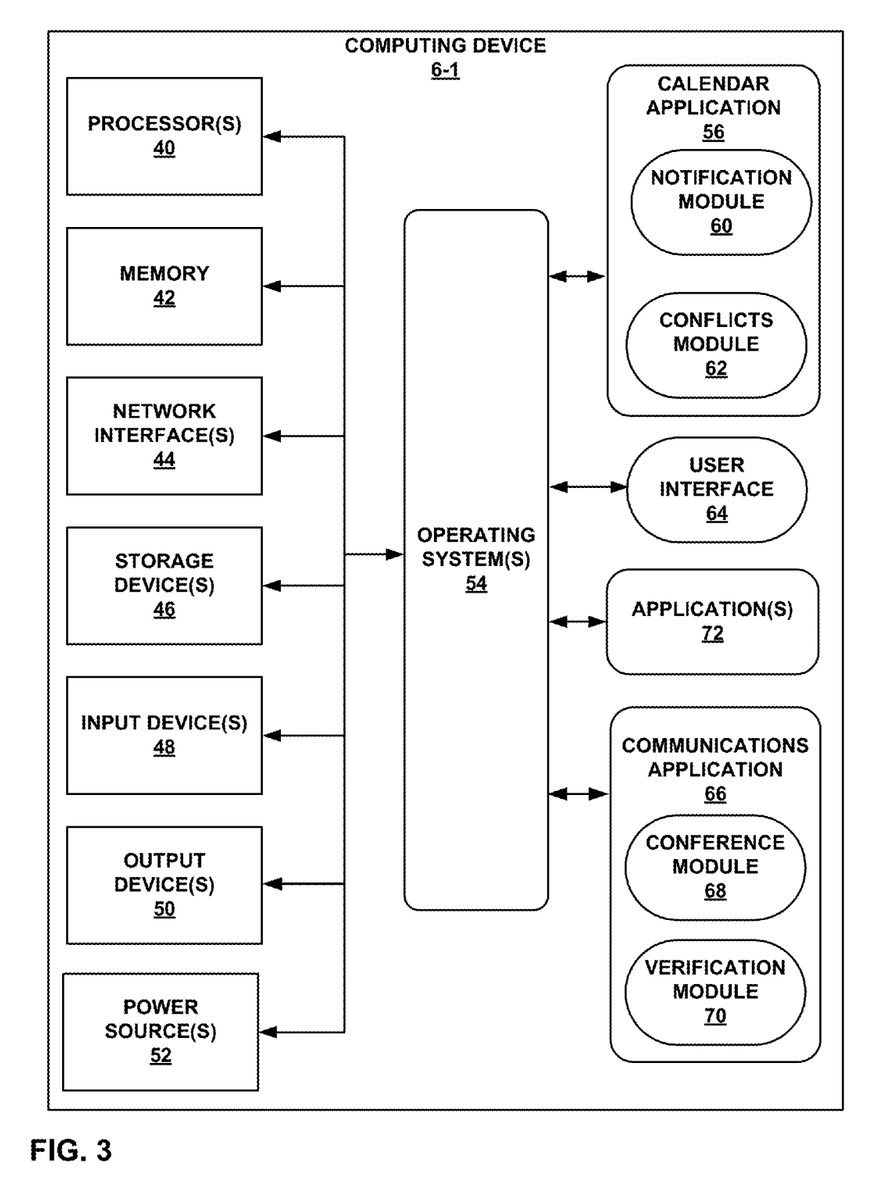
FIG. 3 is a block diagram illustrating an example computing device that utilizes the example system shown in FIG. 1, in accordance with one or more aspects of the present disclosure.

FIG. 3 is a block diagram illustrating example computing device 6-1 that utilizes the example system connecting a plurality of computing devices 6 in a communication session shown in FIG. 1, in accordance with one or more aspects of the present disclosure. FIG. 3 illustrates only one particular example of computing device 6-1, and many other example embodiments of computing device 6-1 may be used in other instances.

As shown in FIG. 3, computing device 6-1 may include calendar application 56, communications application 66, application(s) 72, operating system 54, user interface 64, one or more processors 40, memory 42, one or more network interfaces 44, one or more storage devices 46, one or more input devices 48, one or more output devices 50, and one or more power sources 52. Operating system 54 and applications 56, 66, and 72 are executable by one or more components of computing device 6-1. Each of components 40, 42, 44, 46, 48, 50, and 52 may be interconnected (physically, communicatively, and/or operatively) for inter-component communications.

One or more processors 40 may include, in certain examples, any one or more of a microprocessor, a controller, a digital signal processor (DSP), an application specific integrated circuit (ASIC), a field-programmable gate array (FPGA), or equivalent discrete or integrated logic circuitry. Processors 40, in one example, are configured to implement functionality and/or process instructions for execution within computing device 6-1. For example, processors 40 may be capable of processing instructions stored in memory 42 or storage devices 46.

Memory 42, in one example, is configured to store information within computing device 6-1 during operation. Memory 42, in some examples, is described as a computer-readable storage medium. In some examples, memory 42 is a temporary memory, meaning that a primary purpose of memory 42 is not long-term storage. Memory 42 in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 6-1 (for example, operating system 54 and applications 56, 66, and 72) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. Storage devices 46 may store databases, such as lists of contacts and scheduling data, as well as instructions forming software applications executed by processors 40.

Computing device 6-1 also includes network interface(s) 44. Computing device 6-1, in one example, utilizes network interface(s) 44 to communicate with multiple computing devices, for example, computing devices 6 (FIG. 1) or server device 2 (FIGS. 1 and 2), via one or more networks, for example, network 4. Network interface(s) 44 may be a network interface card, such as an Ethernet card, an optical transceiver, a radio frequency transceiver, or any other type of device that can send and receive information.

Computing device 6-1 also includes one or more input devices 48. Input device(s) 48, in some examples, are configured to receive input from a user through voice, keyboard, or other user input. Examples of input device 34 include a keyboard/keypad, microphone, and video camera. One or more output devices 50 may also be included in computing device 6-1. Output device(s) 50, in some examples, may be configured to provide output to a user using tactile, audio, or visual output. Output device(s) 50, in one example, includes a screen or a speaker, and may utilize a sound card, a video graphics adapter card, or any other type of device for converting a signal into an appropriate form understandable to humans or machines. Additional examples of output device(s) 50 include a speaker, a cathode ray tube (CRT) monitor, a liquid crystal display (LCD), or any other type of device that can generate intelligible output to a user. Input device(s) 48 and output device(s) 50 may interface with user interface 64; for example a touch screen may be both input device 48 and output device 50 and allow a user to interact with user interface 64.

Computing device 6-1, in some examples, may include one or more power sources 52, which may be rechargeable and provide power to computing device 6-1. Power source(s) 52, in some examples, may include batteries made from nickel-cadmium, lithium-ion, or other suitable material. In other examples, computing device 6-1 may be connected to an electrical grid through power source(s) 52, for example, via a power outlet or telephone line.

Computing device 6-1 may include operating system 54. Operating system 54, in some examples, may control the operation of the components of computing device 6-1. For example, operating system 54 may coordinate the interaction of applications 56, 66, and 72 with processor 40, memory 42, network interface(s) 44, storage device(s) 46, input device(s) 48, and output device(s) 50. Any hardware/software/firmware modules, for example, operating system 54, calendar application 56, communications application 66, and application(s) 72, implemented within or executed by computing device 6-1 may be implemented or contained within, operable by, executed by, and/or be operatively/communicatively coupled to components of computing device 6-1, for example, processors 40, memory 42, network interface(s) 44, storage devices 46, input device(s) 48, and output device(s) 50.

Calendar application 56 may include notification module 60 and conflicts module 62. A participant in a communication session may store the details of the communication session in storage device 46 of computing device 6-1 using calendar application 56. Notification module 60 through, in some examples, user interface 64 may interface with input device 48 to receive a user input describing an upcoming communication session. Notification module 60 may store the user input in storage device 46. In some examples, notification module 60 may retrieve data regarding an upcoming communication session stored in storage device 46 and, through output device 50, generate a message reminding an invitee to the communication session associated with computing device 6-1 of the upcoming communication session. Notification module 60 may be configured to transmit data representative of an upcoming communication session to calendar application 8 of server device 2, allowing server device 2 to store the data representative of the upcoming communication session remotely from computing device 6-1. Server device 2 may use the scheduling data for the upcoming communications session to generate requests to join, and to host, the communication session.

Conflicts module 62 may be configured to verify that the communication session scheduled by notification module 60 does not conflict with other events scheduled for a user of computing device 6-1. Conflicts module 62 may access data representative of one or more communication sessions or other events stored in storage device 46 and retrieve scheduled start and end times of the events for comparison. Conflicts module 62 may also retrieve scheduling data located remotely from computing device 6-1, for example, on a third party calendar or scheduling application. Conflicts module 62 may generate a message informing a user of computing device 6-1 of the scheduling conflict. The message may allow the user to reschedule the upcoming communication session or adjust the delivery of the request to join the upcoming communication session to reflect the scheduling conflict. For example, a user may elect to postpone the delivery of the request to join the communication session until after the conflicting event ends. Conflicts module 62 may also generate, or cause messaging module 32 of server device 2, to generate a message notifying those computing devices 6 invited to participate in the communication session of the delay in joining the communication session.

An invitee (or participant) associated with computing device 6-1 may use user interface 64 to enter or retrieve data about the communication session from computing device 6-1 and/or participate in a communication session. User interface 64 may be configured to interface with calendar application 56 and/or communications application 66 to accept input (via input device(s) 48) to and present output (via output device(s) 50) from applications 56, 66, and 72. In some examples, user interface 64 may allow an invitee to the communication session to postpone joining the communication session. User interface 64 may be configured to allow the invitee to specify the duration of the postponement and may interface with communications application 66 and network interface 44 to transmit a control message specifying the duration of the postponement to server device 2. User interface 64 may also be configured to allow an invitee or participant in the communication session to specify another computing device or person to be invited to join the communication session.

Computing device 6-1 may participate in a communications session using network interface 44 under the control of communications application 66. Communications application 66 may also generate and transmit messages managing the participation of computing device 6-1 in the communication session. For example, communications application 66 may generate a control message to be transmitted to server device 2 that specifies another computing device 6 or person to be invited to the communication session. Communications application 66 may include conference module 68 and verification module 70.

Conference module 68 may be configured to allow computing device 6-1 to participate in a communication session. Conference module 68 may control network interface(s) 44 to transmit information, such as words (verbal or textual) and/or images, detected by input device 48 over network 4 to hosting module 30 of server device 2 (FIG. 2). Conference module 68, via network interface(s) 44, may also receive information from computing devices 6 participating in the communication session, relayed to computing device 6-1 by server device 2. Output device 50 may present the relayed words, sounds, and images to the user of computing device 6-1.

Conference module 68 may also be configured to accept input, through user interface 64 and input device(s) 48, allowing a user of computing device 6-1 to control their participation in the communication session. For example, conference module 68 may delay the participation of computing device 6-1 in the communication session based on input, for example, a specification of a delay, to computing device 6-1 via input device(s) 48 and user interface 64.

Verification module 70 may provide security for the communication session. Verification module 70 may be configured to interface with verification module 38 of server device 2 to maintain security over the communication session. For example, verification module 70 may encrypt the transmissions of computing device 6-1 over network 4. Verification module 70 may be configured to verify the identity of the user of computing device 6-1, for example by accepting a passcode or some other identification input.

Applications 72 may be third party programs or other applications executed by computing device 6-1. In some examples, applications 72 may be accessed by calendar application 56 or communications application 66 to perform part or all of the functions ascribed to one of modules 60, 62, 68, and 70. For example, computing device 6-1 may only support video or audio communication through a VoIP program not part of communications application 66. Conference module 68 of communications application 66 may access the VoIP program to allow the user of computing device 6-1 to participate in the communication session. In another example, applications 72 may include a contacts list or scheduling application maintained by computing device 6-1, where calendar application 56 or, in some examples, server device 2, may access the data retained by these applications 72 to perform various functions, such as generating notifications concerning a scheduled communication session or identifying one or more participants in the communication session.

Although shown as separate components in FIG. 3, in some examples, one or more of modules 60, 62, 64, 68, and 70 may be part of the same application or module. In some examples, one or more of modules 60, 62, 64, 68, and 70, and one or more processors 40 may be formed in a common hardware unit. In certain examples, one or more of modules 60, 62, 64, 68, and 70 may be software and/or firmware units that are executed on or operable by one or more processors 40.

Figure 4A:
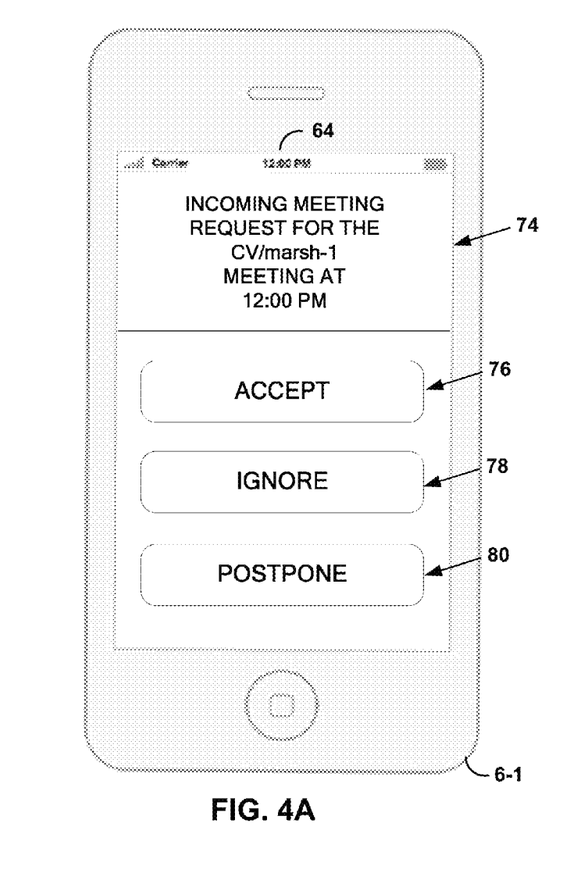
FIGS. 4A and 4B are diagrams illustrating an example graphical user interface that enables a computing device to accept or postpone joining a communication session, in accordance with one or more aspects of the present disclosure.
Figure 4B:
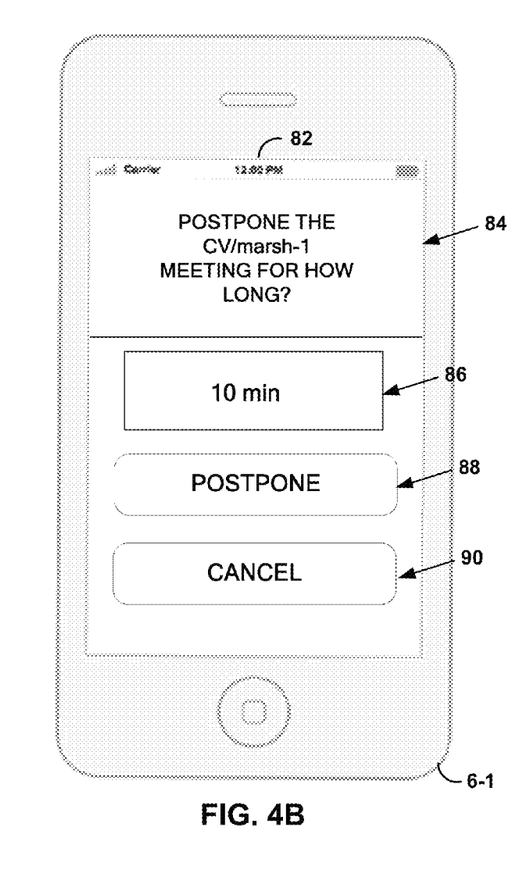

FIGS. 4A and 4B are diagrams illustrating an example graphical user interface 64 that 64 enables computing device 6-1 to accept or postpone joining a communication session, in accordance with one or more aspects of the present disclosure. As shown in FIGS. 4A and 4B, computing device 6-1 may be the same as computing device 6-1 of FIGS. 1 and 3. In other examples computing device 6-1 may be another type or example of computing device.

As shown in FIG. 4A, user interface 64 of computing device 6-1 may be configured to display a message providing information or context to a user of computing device 6-1, such as request 74. Request 74 is an example message requesting the user of computing device 6-1 to join a communication session. Request 74, in this example, identifies the communication session and the start time scheduled for the communication session. Other examples of request 74 may display more or less information. For example, request 74 may also display at least one of a summary of the agenda for the communication session or a list of invitees to the communication session. Other messages may inform the user of computing device 6-1 that an invitee to the communication session is postponing joining the communication session or that a person or computing device not previously scheduled to join the communication session is being invited, and by whom.

In the example configuration shown in FIG. 4A, user interface 64 may present three options to the user of computing device 6-1. To join the communication session, the invitee may press accept button 76. In this example, buttons 76, 78, and 80 may be touch targets on a touch screen. In other examples of user interface 64, buttons 76, 78, and 80 may be physical buttons, keypad entries, verbal commands, and other means of selection. In some examples, by accepting the request to join a communication session, conference module 68 of computing device 6-1 (shown in FIG. 3) may interface with hosting module 30 of server device 2 (shown in FIG. 2) to transmit the words and/or images of the invitee over network 4. If the invitee does not wish to join the communication session, the invitee may press ignore button 78. Ignore button 78 may cause computing device 6-1 to abort communication with server device 2 or to transmit a message to server device 2 stating that the invitee will not participate in the communication session.

The invitee, with example user interface 64, may delay joining the communication session by pressing postpone button 80. In some configurations, actuating postpone button 80 may cause computing device 6-1 to transmit a control message to server device 2 stating that computing device 6-1 will join the communication session at a later time. Server device 2 may track the passage of time and transmit a second request to join the communication session to computing device 6-1 after the duration of the postponement has elapsed. In some examples, computing device 6-1 may track the passage of time and send a request to server device 2 to be re-invited to join the communication session after the postponement has ended.

Actuating postpone button 80 may cause user interface 64 to open a submenu, for example, submenu 82, as shown in FIG. 4B. Submenu 82 may allow an invitee to the communication session to specify the duration of the postponement of joining the communication session. Submenu 82 may include a note 84, a field 86, a postpone button 88, and a cancel button 90.

Note 84 may identify the action the invitee is taking, for example, explaining to the invitee that submenu 82 allows the invitee to postpone joining the communication session. Note 84 may also display other details of the communication session. For example, note 84 may display how long the communication session will last, display how long other invitees have postponed joining the communication session, or show the planned agenda for the communication session. Field 86 may be configured to allow the invitee to input, via input device 48, the duration of the postponement. Field 86 may be a text or data entry field, a drop down menu, or similar means of data entry. Actuating postpone button 88 may cause computing device 6-1 to transmit a control message to server device 2 specifying the duration of the postponement. Computing device 6-1 may wait out the selected postponement before requesting to join the communication session or wait for server device 2 to send a second request to join the communication session. Actuating cancel button 90 may cause computing device 6-1 to abort postponing joining the communication session.

Figure 5:
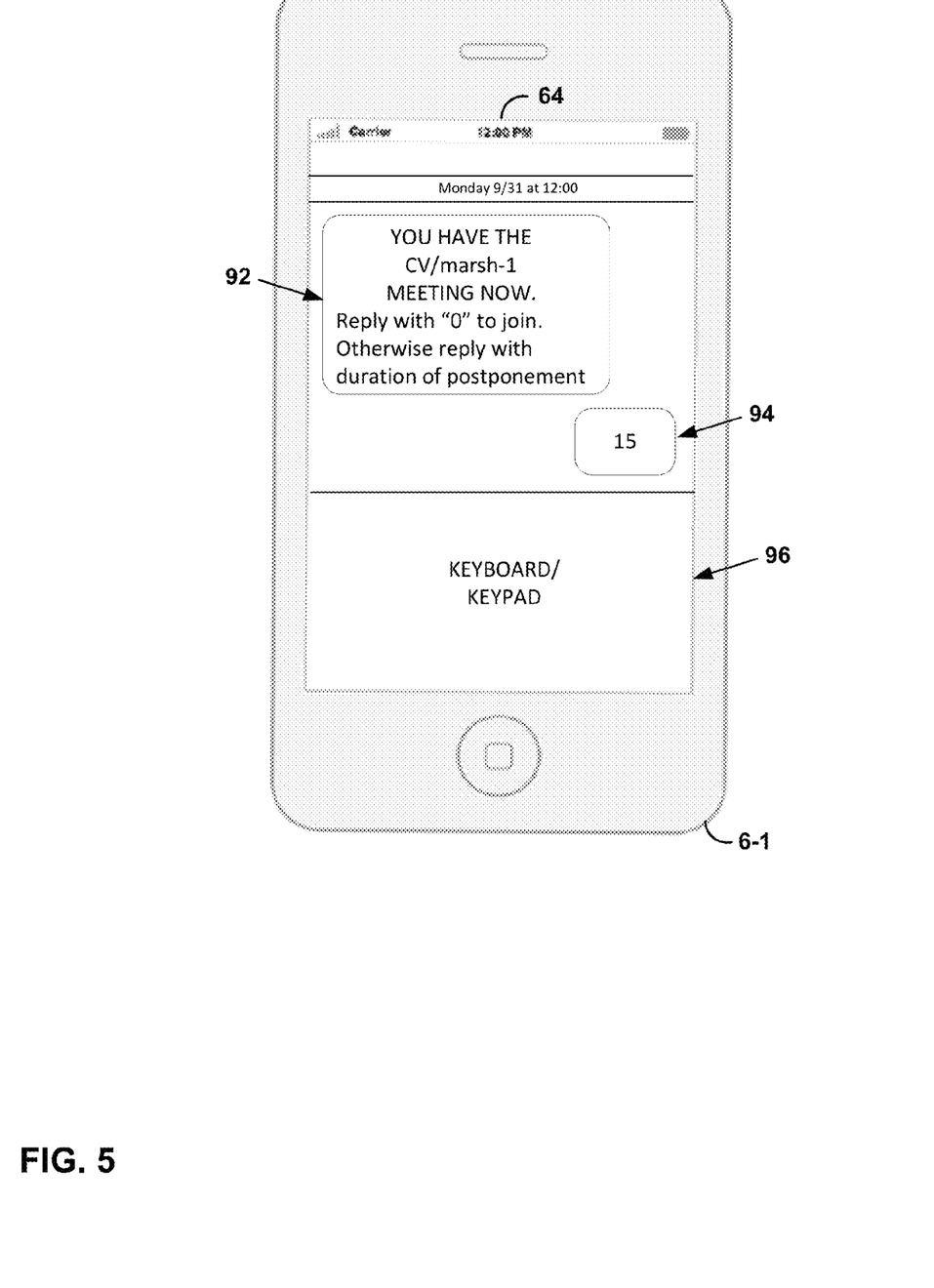
FIG. 5 is a diagram illustrating an example text-based user interface that enables a computing device to accept or postpone joining a communication session, in accordance with one or more aspects of the present disclosure.

FIG. 5 is a diagram illustrating an example text based user interface 64 that enables computing device 6-1 to accept or postpone joining a communication session in accordance with one or more aspects of the present disclosure. As shown in FIG. 5, computing device 6-1 may be the same as computing device 6-1 of FIGS. 1, 3, 4A, and 4B. In other examples computing device 6-1 may be another type or example of computing device.

In some examples, computing device 6-1 may not be able to display the example graphical user interface as discussed with respect to FIGS. 4A and 4B. Other forms of user interface 64 may allow computing device 6-1 to join and participate in the communication session. For example, computing device 6-1 may be capable of sending and receiving SMS text messages. Server device 2 may use the SMS messaging capabilities of computing device 6-1 to send requests to join the communication session and receive control messages from computing device 6-1.

Request text message 92, sent by server device 2, may inform the invitee associated with computing device 6-1 of a scheduled communication session and allow the invitee to join the communication session. Request test message 92 may also allow the invitee to postpone joining the communication session. In one example, the invitee may respond, using a keypad 96, with a control text message 94, specifying the length of the postponement in joining the communication session. In other examples, the invitee to the communication session may not respond, ignoring request text message 92. Server device 2 may send a second request text message to computing device 6-1 after the lapse of a predefined postponement period or after the postponement period specified by control text message 94.

The format of user interface 64 may depend on the capabilities of computing devices 6. A laptop, computer, or smartphone, for example, may be capable of processing and sending data packets to and from server device 2. Data processing capability allows computing device 6 to employ a graphical user interface 64 as discussed in FIGS. 4A and 4B, implemented, for example, as an application or a module in an application. SMS text messaging capability, such as on a cellular phone, may allow a computing device 6 to use a text based user interface as discussed with respect to FIG. 5. A touch-tone phone may use a voice based user interface, where requests from server device 2 are formatted into verbal words, for example using a text-to-speech program or prerecorded statements.

Figure 6:
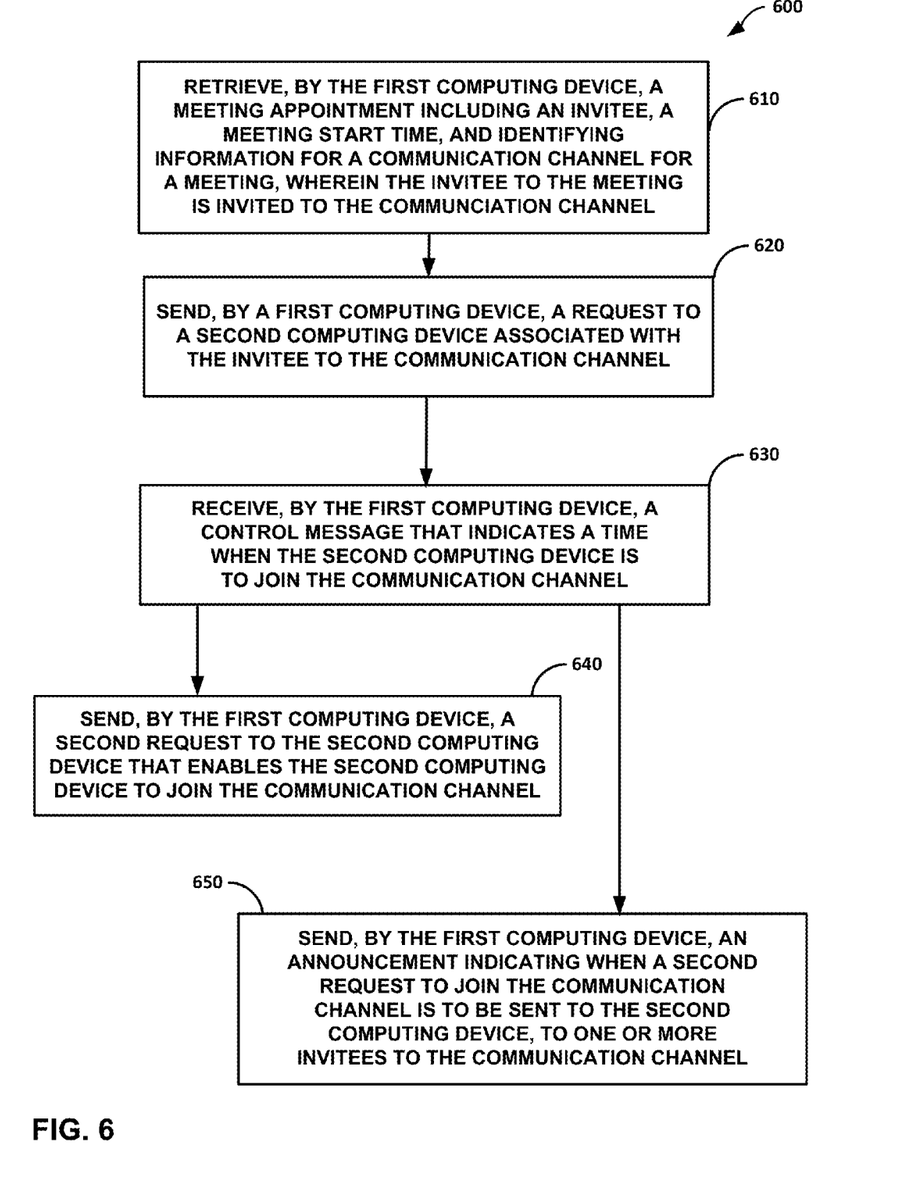
FIG. 6 is a flowchart illustrating an example process for managing joining an example communication session as shown in FIG. 1, in accordance with one or more aspects of the present disclosure.

FIG. 6 is a flowchart illustrating example process 600 for managing joining an example communication session as shown in FIG. 1, in accordance with one or more aspects of the present disclosure. For purposes of illustration only, the example process is described below within the context of server device 2 of FIGS. 1 and 2 and computing device 6-1 of FIGS. 1 and 3. However, example process 600 of FIG. 6 may be performed using other devices.

Server device 2, for example, through notification module 26, may access one or more entries in a calendar or other scheduling program related to a communication session to which a user associated with computing device 6-1 is invited to participate. The entry containing data for the communication session may be stored on computing device 6-1, server device 2, or on a third party server or computing device accessible to server device 2. Server device 2, for example, using messaging module 32 (FIG. 2), may send a meeting reminder to the computing device 6-1 prior to sending a request to join the communication session to the computing device 6-1. The meeting reminder may inform the invitee of the upcoming communication session. In some examples, the meeting reminder may include details of the meeting such as the names of other invitees or the agenda of the upcoming communication session. The meeting reminder may allow computing device 6-1 to reply with a control messaging specifying a delay or a time when the request to join the communication session should be sent to computing device 6-1.

Server device 2 may retrieve a meeting appointment including an invitee, a meeting start time, and identifying information for a communication channel (610). The invitee to the meeting is invited to the communication channel, which may be through the meeting appointment. Messaging module 32 of server device 2 may send a request to computing device 6-1 over network 4 allowing computing device 6-1 to connect to the communication session via hosting module 30 (FIG. 2). The request may also allow computing device 6-1 to postpone joining the communication channel, either for a predefined period or for a duration specified by the invitee associated with computing device 6-1 (for example using user interface 64 in FIGS. 4A and 4B). The request may be sent in a format appropriate to computing device 6-1, for example, the request may be formatted as a data packet readable by communications application 66 when computing device 6-1 is a smartphone or computer, but may be sent as a voice message when computing device 6-1 is a touchtone phone or similar device.

Server device 2 may receive a control message that indicates a time when computing device 6-1 is to join the communication channel (620). Computing device 6-1 may transmit a control message to server device 2 specifying a time or delay in joining the communication channel. Server device 2 may interpret the message with messaging module 32 and store the duration of the delay in memory 18 (FIG. 2). Server device 2 may also verify that the delay in joining the communication channel does not conflict with another scheduled event for the user associated with computing device 6-1 or, in some examples, other participants associated with computing devices 6. Server device 2 may transmit a notification message identifying a potential conflict to the user of computing device 6-1. The notification message may allow the user of computing device 6 to adjust the duration of the delay in joining the communication channel to reduce scheduling conflicts.

Server device 2 may send a second request to computing device 6-1 that enables computing device 6-1 to join the communication channel. The second request may be sent after the lapse of a predefined or user specified postponement period. Computing device 6-1 may join the communication channel, for example, connect to hosting module 30 of server device 2 through conference module 68. In some configurations, the second request may allow computing device 6-1 to further postpone joining the communication channel. Computing device 6-1 may transmit a second control message to server device 2 specifying a further delay in joining the communication channel.

Server device 2 may transmit an announcement indicating when a second request to join the communication channel is to be sent to computing device 6-1 to one or more invitees to the communication channel. Server device 2 may use messaging module 32 to inform one or more of computing devices 6 of the delay in computing device 6-1 joining the communication channel. The announcement may allow the invitees associated with computing devices 6 to postpone joining the communication channel. For example, one or more invitees may synchronize joining the communication channel with computing device 6-1 joining the communication channel. In other examples, the invitees associated with computing device 6 may specify the duration of the postponement. Conflicts module 28 of server device 2 or conflicts module 62 of computing devices 6 may verify that the postponement of computing device 6-1 or a postponement the invitees associated with computing device 6 do not conflict with other scheduled events. Server device 2 may transmit a message to one or more computing devices 6 announcing that computing device 6-1 has joined the communication channel and allow invitees associated with computing devices 6 to join the communication channel as well.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware/software/firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware/software/firmware components, or integrated within common or separate hardware/software/firmware components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a tangible and a non-transitory medium. The term "non-transitory" may indicate that the storage medium is not embodied in a carrier wave or a propagated signal. In certain examples, a non-transitory storage medium may store data that can, over time, change (for example, in RAM or cache).

Various embodiments have been described. These and other embodiments are within the scope of the following claims.

The invention claimed is:

1. A method comprising:

retrieving, by a first computing device, a meeting appointment stored in the first computing device wherein the meeting appointment includes a first invitee and one or more other invitees, a meeting start time, and identifying information for a communication channel for a meeting, wherein the first invitee to the meeting is invited to the communication channel and the first invitee is associated with a second computing device;

prior to the meeting start time, accessing a calendar of the first invitee and the one or more other invitees to determine whether scheduled events conflict with the meeting appointment for the first invitee and the one or more other invitees and notifying the first invitee when scheduled events conflict;

sending, by the first computing device, a first request to the second computing device, wherein the first request enables the second computing device to join the communication channel, and wherein the first request is sent at the meeting start time;

receiving, by the first computing device, a first control message that indicates a first time at which the second computing device will join the communication channel, wherein the first time is later than the meeting start time;

upon receipt of the first control message, accessing, by the first computing device, the calendar of each of the first invitee and the one or more other invitees to determine whether the first time conflicts with another scheduled event for the first invitee and the one or more other invitees and notifying the first invitee when another scheduled event conflicts;

sending an announcement message to one or more other computing devices associated with the one or more other invitees announcing the first time at which the second computing device will join the communication channel wherein the announcement message enables one of the one or more other computing devices associated with one of the one or more other invitees to send a preliminary scheduling message postponing connecting to the communication channel;

sending a connection message to the one or more other computing devices associated with the one or more other invitees when the second computing device has connected to the communication channel to indicate that the second computing device has connected to the communication channel;

receiving, by the first computing device, from the second computing device, a second control message that includes an identifier that identifies a second invitee not specified in the meeting appointment;

identifying, by the first computing device, a third computing device that is associated with the second invitee identified in the second control message; and sending, by the first computing device, a second request to the third computing device, wherein the second request enables the third computing device to join the communication channel.

2. The method of claim 1, further comprising:
sending, by the first computing device, a third request to the second computing device at the first time that enables the second computing device to join the communication channel.

3. The method of claim 2, further comprising receiving, by the first computing device, a fourth control message that indicates a second time at which the second computing device will join the communication channel.

4. The method of claim 1, further comprising receiving, by the first computing device, a fourth control message from the third computing device that indicates a second time at which the third computing device will join the communication channel.

5. The method of claim 1, further comprising:
sending, by the first computing device, a meeting reminder message to the second computing device prior to sending the first request to join the communication channel to the second computing device, wherein the meeting reminder message enables the second computing device to postpone connecting to the communication channel to a second time, wherein the second time is after the meeting start time, and wherein the meeting reminder message includes an indication of the meeting start time; and receiving, by the first computing device, a preliminary scheduling message from the second computing device that indicates the second computing device will join the communication channel at the second time.

6. The method of claim 5, wherein a third request to join the communication channel is sent, by the first computing device, at the second time specified by the second computing device in the preliminary scheduling message.

7. The method of claim 1, further comprising:
sending, by the first computing device, a respective request to each of the one or more other computing devices associated with each of the one or more other invitees, wherein each respective request enables each of the one or more other computing devices to join the communication channel, and wherein each respective request is sent at the meeting start time; and receiving, by the first computing device, a fourth control message that indicates a second time at which at least one of the one or more other computing devices will join the communication channel.

8. The method of claim 1, further comprising:
receiving, by the first computing device, a fourth control message that indicates the second computing device is available to connect to the communication channel; and connecting, by the first computing device, the second computing device to the communication channel.

9. The method of claim 1, wherein the communication channel comprises at least one of a telephonic conference call, a real-time video conference, an internet chat session, and a Voice over Internet Protocol (VoIP) conference call.

10. The method of claim 1, wherein the first request comprises data describing at least one of a type of communication channel, identities of invitees to the communication channel, locations of invitees to the communication channel, a topic of the communication channel, and a schedule of the communication channel.

11. The method of claim 1, further comprising:
sending, by the first computing device, a fourth request that enables the second computing device to join the communication channel when the communication channel is still in progress if the second computing device does not join the communication channel within a predefined period of the first time specified in the first control message.

12. The method of claim 1, wherein the first request to the second computing device comprises at least one of an email message, an Instant Message through an internet chat program, a Short Message Service (SMS) text message, a telephone call, or a data packet readable by an application executable on the second computing device.

13. A non-transitory computer-readable storage medium comprising instructions that, when executed, cause one or more processors of a first computing device to perform operations comprising:

retrieving, by the first computing device, a meeting appointment stored in the first computing device wherein the meeting appointment includes a first invitee and one or more other invitees, a meeting start time, and identifying information for a communication channel for the meeting, wherein the first invitee to a meeting is invited to the communication channel and the first invitee is associated with a second computing device;

prior to the meeting start time, accessing a calendar of the first invitee and the one or more other invitees to determine whether scheduled events conflict with the meeting appointment for the first invitee and the one or more other invitees and notifying the first invitee when scheduled events conflict;

sending a first request to the second computing device, wherein the first request enables the second computing device to join the communication channel, and wherein the first request is sent at the start time specified in a meeting notification of the calendar associated with the first invitee, and wherein the first request comprises at least one of an email message, an Instant Message through an internet chat program, a Short Message Service (SMS) text message, a telephone call, or a data packet readable by an application executable on the second computing device;

receiving a first control message that indicates a first time at which the second computing device will join the communication channel, wherein the first time is later than the meeting start time;

upon receipt of the first control message, accessing, by the first computing device, the calendar of each of the first invitee and the one or more other invitees to determine whether the first time conflicts with another scheduled event for the first invitee and the one or more other invitees and notifying the first invitee when another scheduled event conflicts;

sending an announcement message to one or more other computing devices associated with one or more other invitees announcing the first time at which the second computing device will join the communication channel wherein the announcement message enables one of the one or more other computing devices associated with one of the one or more other invitees to send a preliminary scheduling message postponing connecting to the communication channel;

sending a connection message to the one or more other computing devices associated with the one or more other invitees when the second computing device has connected to the communication channel to indicate that the second computing device has connected to the communication channel;

receiving, by the first computing device, from the second computing device, a second control message that includes an identifier that identifies a second invitee not specified in the meeting appointment;

identifying, by the first computing device, a third computing device that is associated with the second invitee identified in the second control message; and sending, by the first computing device, a second request to the third computing device, wherein the second request enables the third computing device to join the communication channel.

14. The non-transitory computer-readable storage medium of claim 13, wherein the operations further comprise sending a third request to the second computing device at the first time that enables the second computing device to join the communication channel.

15. The non-transitory computer-readable storage medium of claim 13, wherein the operations further comprise receiving a fourth control message that indicates a second time at which the second computing device will join the communication channel.

16. A first computing device, comprising:
at least one processor;
at least one network device; and
a communications module configured to retrieve a meeting appointment stored in the first computing device wherein the meeting appointment includes a first invitee and one or more other invitees, a meeting start time, and identifying information for a communication channel for the meeting, wherein the first invitee to the meeting is invited to the communication channel and the first invitee is associated with a second computing device, wherein the communications module is further configured to access a calendar of the first invitee and the one or more other invitees prior to the meeting start time to determine whether scheduled events conflict with the meeting appointment for the first invitee and the one or more other invitees and notify the first invitee when scheduled events conflict, wherein the communications module is further configured to send a first request to the second computing device, wherein the first request comprises data describing at least one of a type of communication channel, identities of invitees to the communication channel, locations of invitees to the communication channel, a topic of the communication channel, and a schedule of the communication channel, wherein the first request enables the second computing device to join the communication channel, and wherein the first request is sent at the start time specified in a meeting notification of the calendar associated with the first invitee, wherein the communications module is further configured to receive a first control message that indicates a first time at which the second computing device will join the communication channel, wherein the first time is later than the start time specified in the meeting notification, wherein the communications module is further configured, upon receipt of the first control message, to access the calendar of each of the first invitee and the other or more other invitees to determine whether the first time conflicts with another scheduled event for the first invitee and the one or more other invitees and notify the first invitee when another scheduled event conflicts, wherein the communications module is further configured to send an announcement message to one or more other computing devices associated with the one or more other invitees announcing the first time at which the second computing device will join the communication channel wherein the announcement message enables one of the one or more other computing devices associated with one of the one or more other invitees to send a preliminary scheduling message postponing connecting to the communication channel, wherein the communications module is further configured to send a connection message to the one or more other computing devices associated with the one or more other invitees when the second computing device has connected to the communication channel to indicate that the second computing device has connected to the communication channel, wherein the communications module is further configured to receive from the second computing device, a second control message that includes an identifier that identifies a second invitee not specified in the meeting appointment, wherein the communications module is further configured to identify a third computing device that is associated with the second invitee identified in the second control message, and wherein the communications module is further configured to send a second request to the third computing device, wherein the second request enables the third computing device to join the communication channel.

17. The first computing device of claim 16, wherein the communications module is further configured to send a third request to the second computing device at the first time that enables the second computing device to join the communication channel.

18. The first computing device of claim 16, wherein the communications module is further configured to receive a fourth control message that indicates a second time at which the second computing device will join the communication channel.

19. The first computing device of claim 16, wherein the communications module is further configured to receive a fourth control message from the third computing device that indicates a second time at which the third computing device will join the communication channel.

\* \* \* \* \*